UNITED STATES PATENT OFFICE.

MILES R. MOFFATT AND HARRY S. SPIRA, OF PROVIDENCE, RHODE ISLAND.

BROWN SULFUR DYE AND PROCESS OF MAKING SAME.

No. 886,532.　　　　Specification of Letters Patent.　　　　Patented May 5, 1908.

Application filed June 6, 1907. Serial No. 377,671. (Specimens.)

*To all whom it may concern:*

Be it known that we, MILES R. MOFFATT and HARRY S. SPIRA, citizens of the United States, residing in Providence, in the county of Providence and State of Rhode Island, have invented a new and useful composition of matter belonging to the class of sulfur dyestuffs to be used for dyeing cotton yarns and cotton goods, of which the following is a specification.

Our composition consists of, the following ingredients, combined in the proportions stated, viz: We have obtained this new dye by stirring crude wood tar with about 10% of its weight of caustic soda previously dissolved in a little water, pouring off the liquor, and washing the residual tar several times with cold water. In this way we remove the phenols and kresols from the tar. If a much less amount of caustic soda is used, the phenol and kresols are not completely removed and their presence can be shown by qualitative tests. The tar after this treatment is much less fluid than in its original crude state and is semi-solid. In proceeding from this point we fuse the residual tar from the caustic soda treatment with sulfur and sodium sulfid, and we obtain a stronger dye than when crude wood tar is fused with sulfur and sodium sulfid. For example, the proportions we use are one part sodium sulfid and one part and one half of sulfur to one part of the residual tar. The fusion is kept up, until the melt becomes dry, although as a rule the temperature is not allowed to much exceed 200 C. The melted mass after cooling is broken up and powdered, or it may be dissolved in dilute sodium sulfid solution, and the dye precipitated with acid.

The dye we have obtained substantially as described is a black powder, partly soluble in hot water, completely soluble in sodium sulfid from which latter solution it dyes cotton a deep brown, which is very fast to scouring and cross-dyeing and fast to light.

What we claim and desire to secure by Letters Patent of the United States is:

1. The process of making a sulfur dye by first treating wood-tar with alkaline solutions until the phenol and kresols have been removed, and then fusing the residual tar with sulfur and alkaline sulfids substantially as described.

2. As an article of manufacture, the brown dye, derived from wood tar, partly soluble in water and easily soluble in sodium sulfid from which solution it may be precipitated by acids, and capable of dyeing unmordanted cotton a brown color, fast to light, scouring and cross dyeing.

In testimony whereof we have signed our names to this specification in the presence of two subscribing witnesses.

MILES R. MOFFATT.
　　　　　　　　HARRY S. SPIRA.

Witnesses:
　　WILLIAM E. REDDY,
　　CHARLES M. SALISBURY.